United States Patent [19]

Herscovici

[11] Patent Number: 5,463,673
[45] Date of Patent: Oct. 31, 1995

[54] IN-BUILDING RADIO DEPLOYMENT TECHNIQUE FOR WIRELESS PERSONAL COMMUNICATIONS SYSTEMS

[75] Inventor: Bernard Herscovici, Kanata, Canada

[73] Assignee: Northern Telecom Limited, Montreal, Canada

[21] Appl. No.: 53,749

[22] Filed: Apr. 29, 1993

[51] Int. Cl.⁶ .................................................. H04B 15/00
[52] U.S. Cl. ............................. 379/59; 379/63; 455/33.1; 455/62
[58] Field of Search .................................. 379/59, 58, 21, 379/27, 29, 34; 455/33.1, 33.4, 67.2, 67.4, 67.1, 62, 56.1, 67.3

[56] References Cited

U.S. PATENT DOCUMENTS

| | | | |
|---|---|---|---|
| 4,759,051 | 7/1988 | Han | 379/59 |
| 4,771,448 | 9/1988 | Koohgoli et al. | 379/59 |
| 4,881,271 | 11/1989 | Yamauchi et al. | 379/59 |
| 5,289,527 | 2/1994 | Tiedemann, Jr. | 379/59 |
| 5,293,640 | 3/1994 | Gunmar et al. | 379/59 |
| 5,307,510 | 4/1994 | Gunmar et al. | 455/67.1 |
| 5,349,631 | 9/1994 | Lee | 379/59 |

*Primary Examiner*—Edward L. Coles, Sr.
*Assistant Examiner*—Fan Lee
*Attorney, Agent, or Firm*—Yoshiharu Toyooka

[57] ABSTRACT

A novel in-building radio deployment technique is disclosed. Wireless personal communications systems will see a large growth in public acceptance. Presently, deployment of a personal communications system in a building is a time consuming and costly procedure which must be performed on site. The invention measures precise locations of cell centers efficiently and rapidly. It maps the coverage of each cell when a measuring base station interrogates, by wireless, measuring handsets located at critical points of the cell.

8 Claims, 5 Drawing Sheets

32

IN-BUILDING RADIO DEPLOYMENT TECHNIQUE FOR WIRELESS PERSONAL COMMUNICATIONS SYSTEMS

FIELD OF THE INVENTION

The present invention is directed to a technique of provisioning a personal telecommunications system and in particular it is directed to a method of determining locations at which wireless base stations are to be installed in a communication coverage area.

BACKGROUND OF THE INVENTION

When a personal telecommunications service system (sometimes called a cordless or wireless telephone service system) is provisioned at a customer site, it is made sure that enough base stations are provided to ensure that a single cordless (wireless) handset user can receive or make a call from any part of the building. In practice, traffic requirements are also considered and provisioning must take into account numerous wireless handset users who may be in relative proximity to the same base station. To send or receive a signal from a base station, a wireless handset must be within radio range of a base station. The radio range of a base station is determined by measuring the strength of the radio signal between it and a wireless handset, using an RDT (radio deployment tool). The RDT consists of an RDT base station containing a transmitter to send a test signal and an RDT wireless handset for measuring the strength of the test signal received from the RDT base station, called RSSI (received signal strength indication). A master control which connects by wire or wireless to control and record data concerning the operation of the base station and the RSSI sent back by the wireless handset may also be included.

Radio signals radiate from a base station uniformly in all directions when there are no obstructions to the signals. The same is true for receiving signals sent by a wireless handset. How far the radio signal travels depends on the construction materials of the walls, as well as the presence of other RF (radio frequency) barriers such as metalwork, concrete or marble walls, etc. which interfere with signal propagation. Since base stations (and wireless handsets) have a limited radio range, the building needs to be divided into units of coverage called cells. Base stations will be installed at the center of cells when provisioning is completed. Each cell is the area of radio coverage provided by one or more base stations in the same location to an acceptable RSSI level.

Provisioning of a building is conducted by partitioning the floor layouts into cells, as determined by the RDT. There is a specific threshold, called the hand-off threshold, used to measure a cell's range. This is to ensure continuous radio coverage as wireless handset users move throughout the building. The threshold has been set to allow the system to hand-off a call before the radio link is lost or the wireless handset is out of radio range. Specifically, hand-off is the capability of the system to transfer an active call from a radio in one cell to a radio in another cell.

Wireless handset users who are mobile require continuous radio coverage. Hand-off by the system allows calls to be transferred from a radio in one cell to a radio in another cell when the signal strength is becoming unacceptable. By way of example, presently the hand-off threshold is customarily set at −73 dBm. At this value, the radio signal is still adequate but the system will start looking for an available radio in another cell before the link is lost.

One of the main objectives of provisioning is to meet the customer's needs, using the least number of base stations. The strategy adopted for the wireless system requires the identification of the outer bounds of the coverage that the signal must reach. For a building, these are the outer walls. Partitioning the coverage area into cells begins at the extreme points of the building and continues towards the center. In this way, radio signals are kept within the building as much as possible. The outcome of provisioning should be the exact location of the minimum number of base stations necessary to meet the customer's needs.

OBJECTS OF THE INVENTION

It is therefore an object of the present invention to provide an improved deployment method for a personal communications services system.

It is another object of the present invention to provide a new radio deployment technique that is faster and more economical to perform.

It is a further object of the present invention to provide a method of determining the location of a cell center at which a base station is to be installed.

SUMMARY OF THE INVENTION

Briefly stated, the present invention is generally directed to an in-building wireless telephone system having base stations which are located at cell centers within a wireless telephone coverage area. In particular, the present invention is directed to a method of determining the location of a cell center for a base station which comprises steps of (1) locating wireless measuring handsets at critical points of the coverage area, (2) locating a wireless measuring base station at an approximate cell center of the coverage area, and (3) determining the precise location of the cell center of the coverage area by monitoring the RSSI of a measuring signal transmitted between each of the wireless measuring handsets and the wireless measuring base station.

In another aspect, an in-building wireless telephone system has a plurality of base stations which are located at cell centers within a wireless telephone coverage area. The coverage area is partitioned into a plurality of cells. The invention is directed to a method of determining precise locations of cell centers for the base stations which comprises steps of (1) locating wireless measuring handsets at several critical points of the coverage area of a first cell, (2) locating a wireless measuring base station at an approximate cell center of the first cell, and (3) determining the precise location of the cell center of the first cell by monitoring the RSSI of a measuring signal transmitted between each of the wireless measuring handsets and the wireless measuring base station. The method further includes steps of (4) mapping a cell edge of the first cell, (5) locating measuring handsets at other critical points and one or more points along the cell edge of the first cell, and (6) locating a measuring base station at an approximate cell center of the second cell adjacent to the first cell. Additionally, the method has steps of (7) determining the precise location of the cell center of the second cell by monitoring the RSSI of a measuring signal transmitted between each of the wireless measuring handsets and the wireless measuring base station, (8) mapping a cell edge of the second cell, and repeating above steps (5) to (8) for all the cells adjacent to each other within said coverage area.

BRIEF DESCRIPTION OF THE DRAWINGS

For a complete understanding of the present invention and for further objects and advantages thereof, reference may now be made to the following description, taken in conjunction with the accompanying drawings, in which.

DETAILED DESCRIPTION OF THE PREFERRED EMBODIMENTS OF THE INVENTION

For provisioning the wireless telephone system, it is important to: (a) determine the minimum required base stations which provide full radio coverage over any given area to an acceptable level of service, and (b) determine the best locations for installing the base stations.

When the area of the building where radio coverage is needed is identified, it is partitioned into cells by identifying the cell centers. According to presently accepted practice, the strategy for providing coverage is to begin with the most difficult locations (called critical points) for signals to reach such as high speed elevators, stairwells, outermost corners of buildings, and then include the less difficult areas of a building such as halls and office areas. These critical points are used to determine the locations of cell centers.

Therefore, in summary, these critical points mark:

extreme points of the area being covered (for example, external corners of a building);

special areas of concern (for example, elevators, stairwells, or other places which may be difficult for radio signals to reach).

Figure 1:
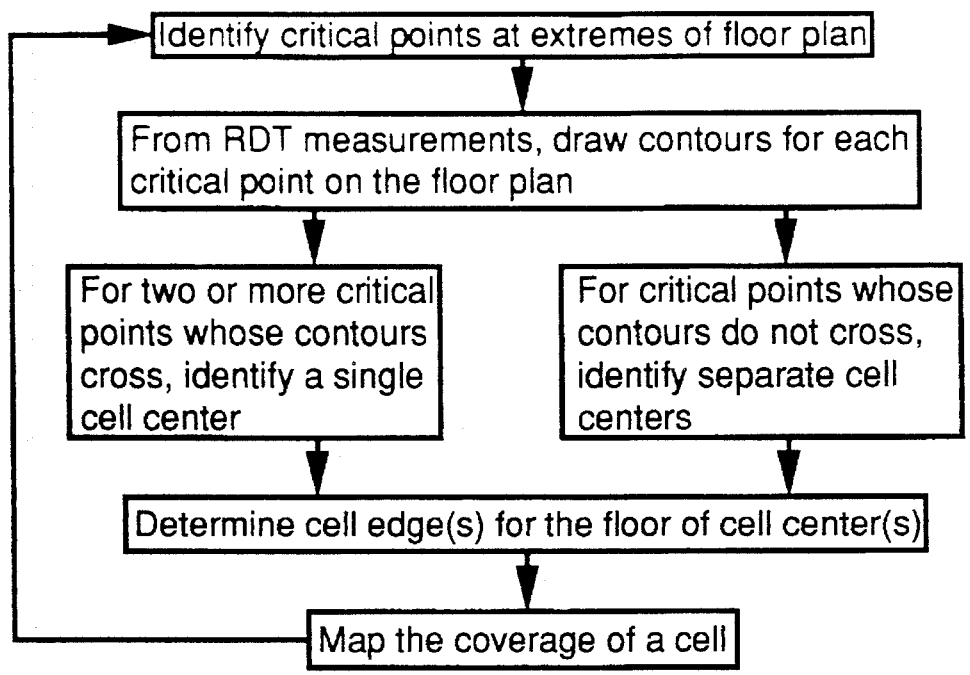
FIG. 1 is a chart showing steps of the radio deployment procedure, according to the prior art.
Figure 2:
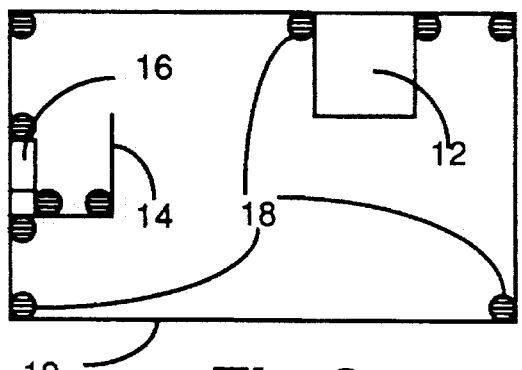
FIGS. 2–11 are diagrams showing various stages of the radio deployment procedure, according to the prior art.

FIG. 1 shows the general procedure for determining a cell center and its coverage area, according to the prior art. As an example, FIGS. 2–11 illustrate diagrammatically the procedural steps which would be used to map a floor of a building. The building contains an area 12 not requiring radio coverage, walls 14, and furniture. The procedure consists of the following steps:

Step 1—Find and mark critical points of the floor (FIG. 2).

Figure 3:
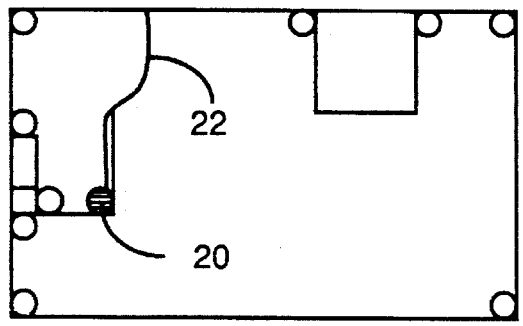
Figure 6:
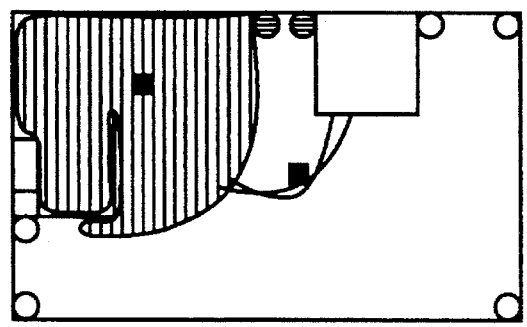

Step 2—Locate a measuring base station 18 (called an RDT base station) at one of the critical points 20 (FIG. 3). Throughout the drawings critical points in use are marked by shading.

Step 3—By using a portable measuring handset (called an RDT handset), obtain RSSIs (received signal strength indications) at various locations and draw a contour 22 of the radio coverage for the critical point (FIG. 3).

Figure 4:
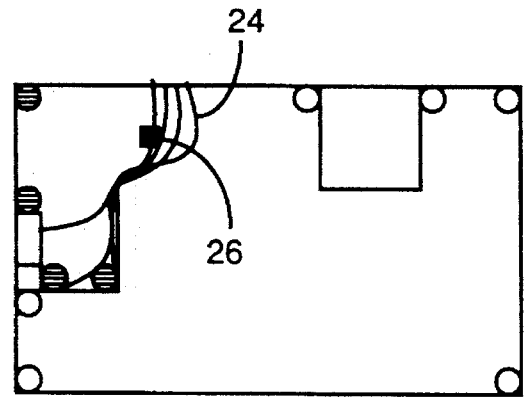
Figure 7:
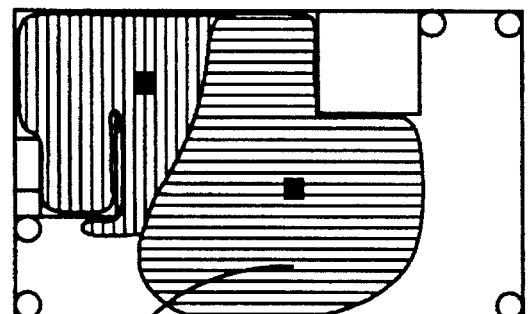
Figure 8:
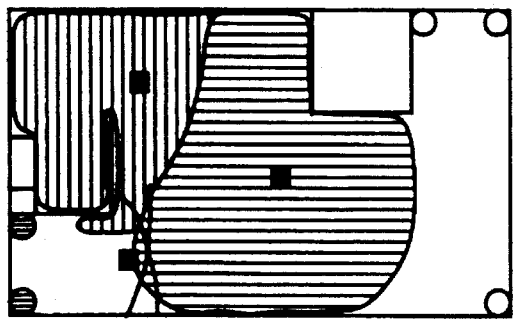
Figure 11:
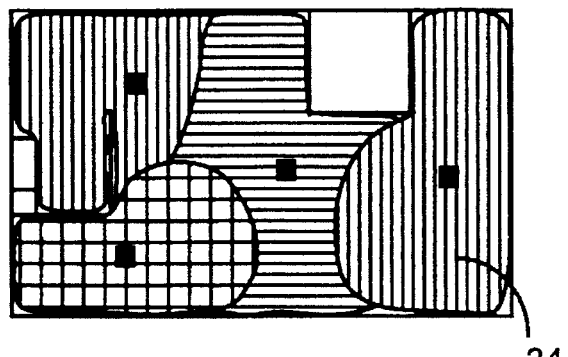
Figure 9:
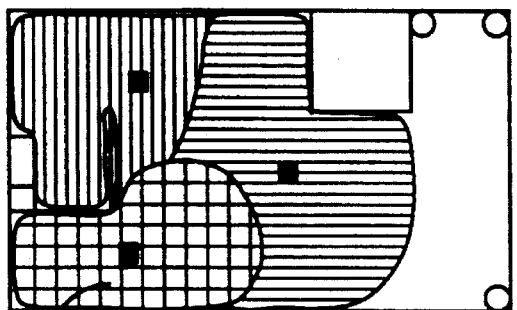
Figure 10:
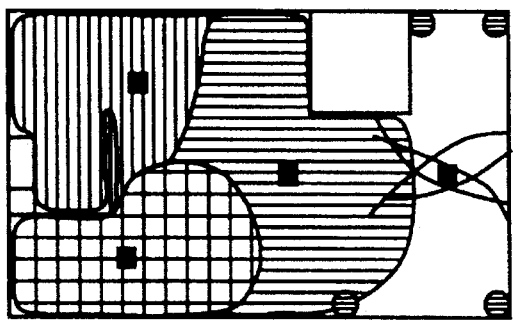

Step 4—Repeat RSSI measurements and draw a contour 24 for each of the remaining critical points (FIG. 4).

Step 5—Find the cell center 26 for a cell. For two or more critical points whose contours cross, identify a single cell center. For critical points whose contours do not cross, identify separate cell centers (FIG. 4).

Figure 5:
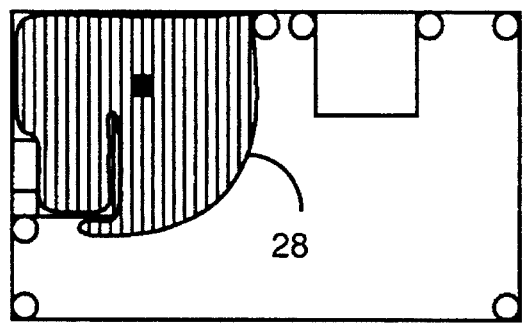

Step 6—Map cell coverage by locating the RDT base station at the cell center and determining a cell edge for the cell by measuring RSSI and drawing the contour 28 (FIG. 5).

Step 7—Repeat step 1–6 for each of the adjacent cells 30, 32 and 34 until the whole coverage area is mapped (FIGS. 6–11).

The RDT base station is identical to base stations used in the actual deployed system, except that it cannot be connected to a central switching unit. The wireless handset of the RDT displays the strength of the signal received from the base station continuously, as it is being carried by a user to make measurements at various distances from the base station.

Once a cell center has been identified, it is possible to determine its edge using the RDT handset and base station. A cell edge is a closed contour that is determined by −73 dBm measurements or other threshold measurements taken for a given cell center. Contours for critical points do not need to be closed because they are used to find the cell centers only. It may be necessary to take more RSSI measurements to determine cell edges than for contours of critical points.

When a cell center and its edge which provide signal to these critical points have been identified, the next set of critical points should be chosen at the periphery of the remaining uncovered area. At each stage, critical points that mark the limit or range to which any new cell centers should provide coverage are chosen. To determine cell centers which reach two nearby external corners, it is necessary to place the base station in one of the corners and find the contour using −73 dBm or some such threshold. The same is done for the other corner. If the contours for the two corners intersect, a base station placed at this intersection point should have its radio signal reach both corners adequately. This intersection point is an ideal spot for a cell center. With a single cell, coverage is provided to each corner, but not beyond. As seen above, the known process identifies a cell at a time by measuring each of critical points. The amount of work is proportional to the sum of the number of critical points and cells.

Figure 12:
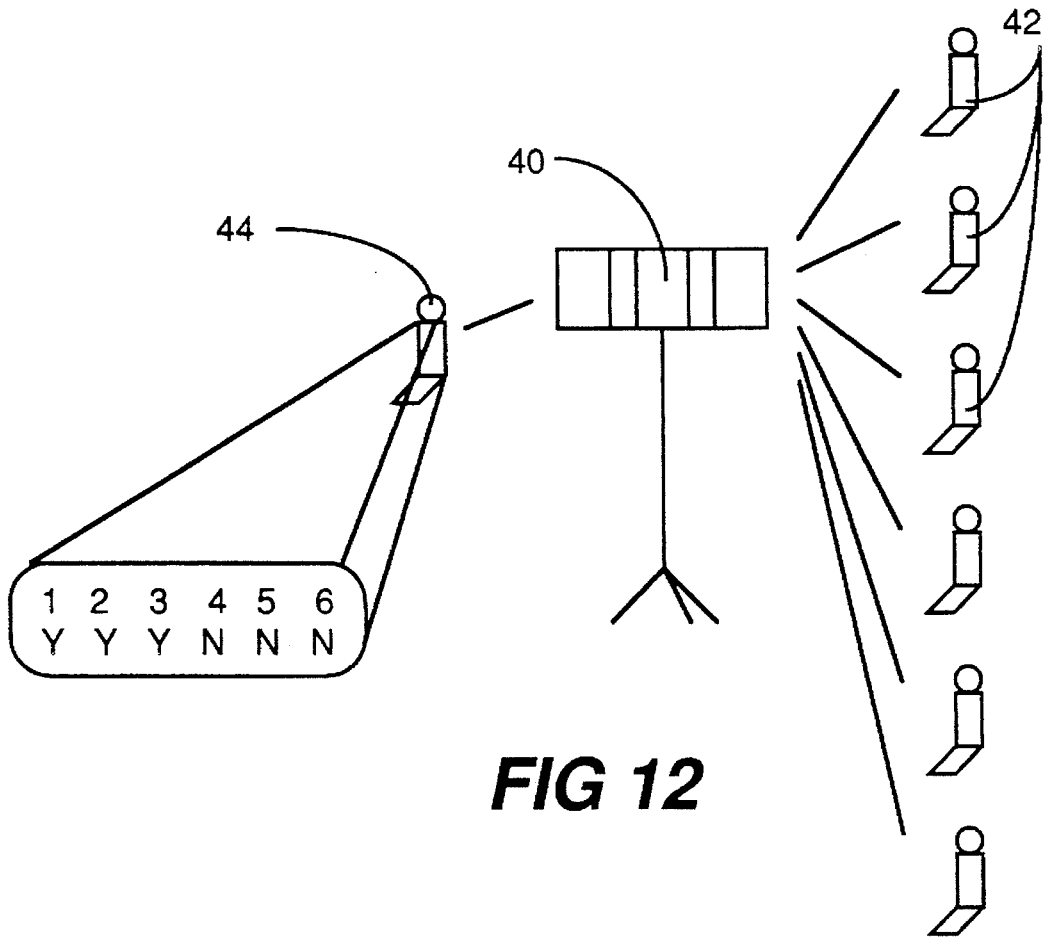
FIG. 12 is a schematic illustration of a setup to be used for the radio deployment, according to one embodiment of the present invention.

FIG. 12 shows schematically the setup which is used for determining locations of cell centers, according to the present invention. A wireless measuring base station 40 is identical to the RDT base station described above and transmits a measuring signal at a certain frequency. A plurality of wireless measuring handsets 42 communicate with the base station 40 by wireless. Thus each handset contains a signal strength meter which measures RSSI of the measuring signal and a transceiver is for sending the measurement to the base station. Most mobile phone handsets presently available on the market include signal strength measuring and displaying capability. Therefore with appropriate modifications (software and/or hardware), these handsets can be used as the wireless measuring handset to be used in the present invention. In response to an interrogating signal from the base station, each measuring handset sends the measurement to the base station. The base station can now scan all the handsets, one after another. The base station can include display and recording devices. Alternatively, a master control 44 can communicate with the base station by wireless and s control its operation. In the figure, a master control is shown displaying the results of measurements. A Y indicates RSSI above the threshold and an N below the threshold.

Figure 13:
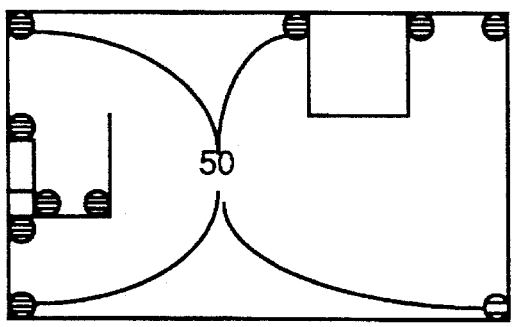
FIGS. 13–21 are diagrams showing various stages of the radio deployment procedure, according to the present invention.
Figure 16:
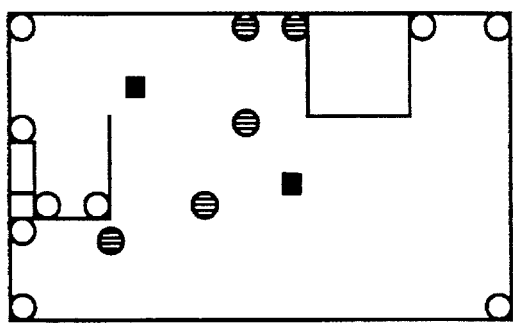

Referring now to FIGS. 13–21, the present invention is diagrammatically illustrated according to one of the preferred embodiments. In the embodiment, cell centers are identified as follows:

Step 1—Find and mark critical points 50 of a floor (FIG. 13).

Figure 14:
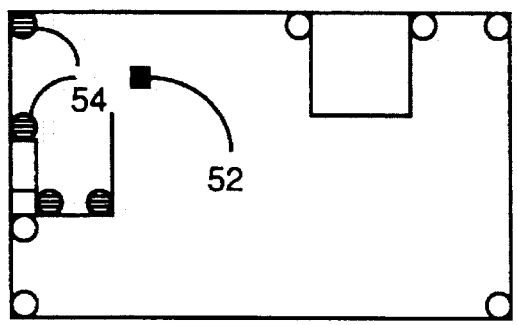
Figure 17:
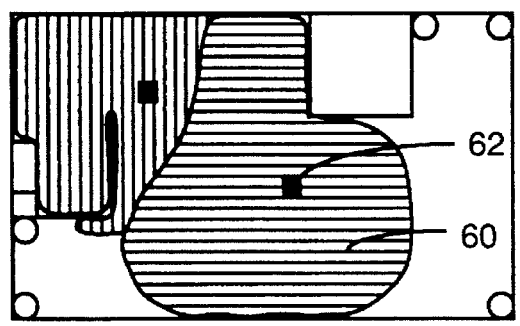

Step 2—Locate an RDT base station at an approximate location of the cell center 52 of a first cell and a plurality of RDT handsets at critical points 54 (FIG. 14).

Step 3—Obtain RSSI for each RDT handset, the RDT base station interrogating each RDT handsets (FIG. 14).

Figure 15:
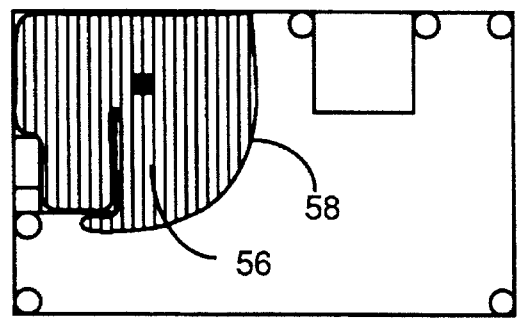
Figure 18:
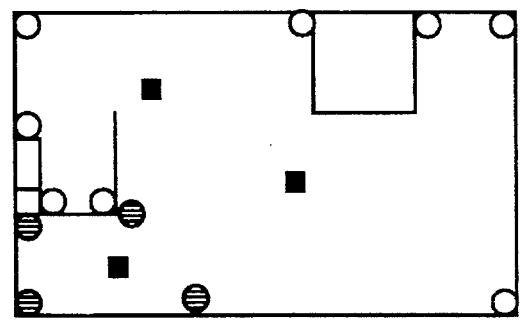
Figure 19:
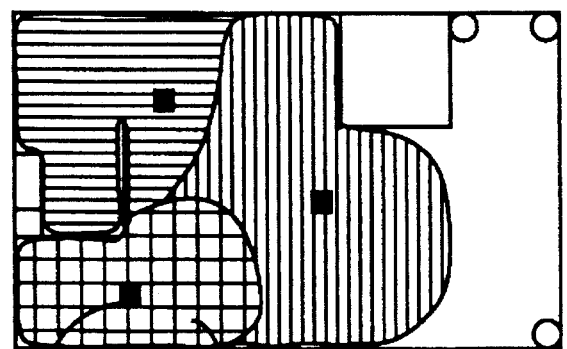
Figure 20:
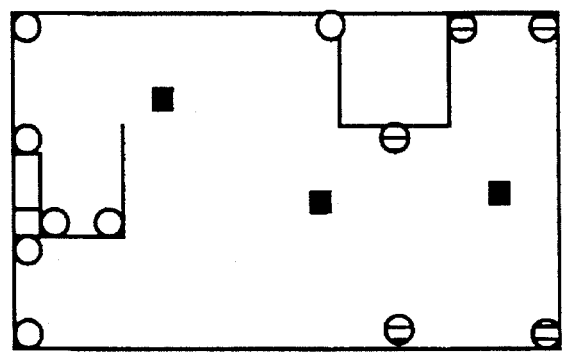
Figure 21:
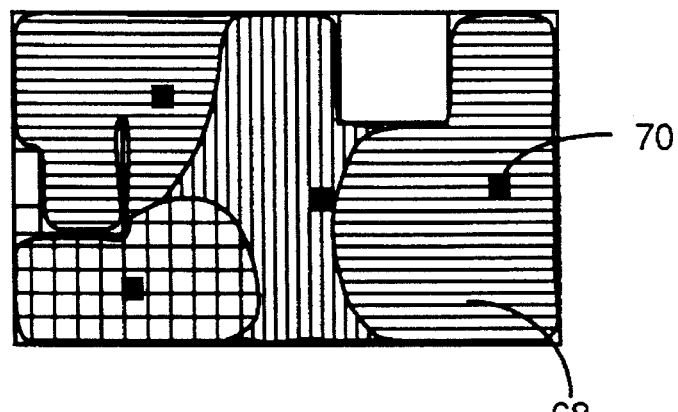

Step 4—Find the precise location of the cell center of the first cell by adjusting the RDT base station while monitoring RSSI of each RDT handset (FIG. 15).

Step 5—Map cell coverage by locating a base station at the cell center and determining cell edge for the first cell 56 by drawing the contour 58 (FIG. 15).

Step 6—Repeat step 1–4 for each of the adjacent cells 60, 64 and 68 with cell centers 62, 66 and 70 until the whole coverage area is mapped (FIGS. 16–21). In FIGS. 14–21, critical points in use are identified by shading.

Thus, while the prior art approach measures several critical points one at a time, and then finds and verifies one cell coverage to another, the present invention identifies the cell center directly by using a plurality of handsets at all critical points of each cell. The measuring base station sends out a measuring signal to all the measuring handsets and subsequently transmits an interrogation signal to each handset to request the RSSI. More conveniently, the measuring signal can contain a code to interrogate each handset. To scan all handsets, interrogation signals can be sent to them on the same or different frequencies by identifying one handset at a time in rapid succession. Alternatively, the measuring base station sends out an interrogating signal to each measuring handset, which responds to it by transmitting a standard measuring signal to the base station. In yet another embodiment, each measuring handset can transmit a standard measuring signal continuously at a different frequency. The base station is equipped with a field strength meter to measure the RSSI of the measuring signal sent by each handset. The precise location of the cell center can be determined by adjusting the location of the base station while monitoring the RSSIs measured at the handsets or at the base station.

According to the inventor's estimate, the deployment procedure according to the present invention should save 75% of the known radio-deployment time and cost.

I claim:

1. In an in-building wireless telephone system having a plurality of base stations which are located at cell centers within a wireless telephone coverage area, the coverage area being partitioned into a plurality of cells, a method of determining precise locations of cell centers for the base stations comprising steps of:

(1) locating wireless measuring handsets at several critical points of the coverage area of a first cell;

(2) locating a wireless measuring base station at an approximate cell center of the first cell;

(3) determining the precise location of the cell center of the first cell by monitoring the RSSI of a measuring signal transmitted between each of the wireless measuring handsets and the wireless measuring base station;

(4) mapping a cell edge of the first cell;

(5) locating measuring handsets at other critical points and one or more points along the cell edge of the first cell;

(6) locating a measuring base station at an approximate cell center of a second cell adjacent to the first cell;

(7) determining the precise location of the cell center of the second cell by monitoring the RSSI of a measuring signal transmitted between each of the wireless measuring handsets and the wireless measuring base station;

(8) mapping a cell edge of the second cell; and (9) repeating steps (5) to (8) for all the cells adjacent to each other within said coverage area.

2. The method of determining the location of a cell center for the base station according to claim 1, wherein the step of determining the precise location of the cell center comprises steps of:

the wireless measuring base station transmitting the measuring signal, each of the wireless measuring handsets monitoring the RSSI of the measuring signal; and sending the result to the measuring base station in response to an interrogating signal sent thereby.

3. The method of determining the location of a cell center for the base station according to claim 1, wherein the step of determining the precise location of the cell center comprises steps of:

each of the wireless measuring handsets transmitting the measuring signal; and the wireless measuring base station monitoring the RSSI of the measuring signal.

4. The method of determining the location of a cell center for the base station according to claim 3, wherein the step of determining the precise location of the cell center comprises steps of:

each of the wireless measuring handsets transmitting the measuring signal on different frequencies; and the wireless measuring base station monitoring the RSSI of the measuring signals.

5. The method of determining the location of a cell center for the base station according to claim 3, wherein the step of determining the precise location of the cell center comprises steps of:

each of the wireless measuring handsets transmitting the measuring signal on the same frequency in response to an interrogating signal sent by the wireless measuring base station; and the wireless measuring base station sending the interrogating signal to each of wireless measuring handsets and monitoring the RSSI of the measuring signal transmitted therefrom.

6. The method of determining the location of a cell center for the base station according to claim 2, further comprising a step of:

a master control means controlling the operation and recording of the measuring base station by a wireless link.

7. The method of determining the location of a cell center for the base station according to claim 4, further comprising a step of:

a master control means controlling the operation and recording of the measuring base station by a wireless link.

8. The method of determining a location of a cell center for the base station according to claim 5, further comprising a step of:

a master control means controlling the operation and recording of the measuring base station by a wireless link.

\* \* \* \* \*